US012315334B2

(12) United States Patent
Lind et al.

(10) Patent No.: US 12,315,334 B2
(45) Date of Patent: May 27, 2025

(54) APPARATUS, SYSTEM AND METHOD FOR ELECTRONIC GAMING

(71) Applicant: Exacta Systems, LLC, Boynton Beach, FL (US)

(72) Inventors: Jefferson C. Lind, Austin, TX (US); Joseph R. Enzminger, Austin, TX (US); Jeremy F. Stein, Wellington, FL (US); Glen M. Rose, Wellington, FL (US)

(73) Assignee: Exacta Systems, LLC, Louisville, KY (US)

( * ) Notice: Subject to any disclaimer, the term of this patent is extended or adjusted under 35 U.S.C. 154(b) by 0 days.

(21) Appl. No.: 18/196,635

(22) Filed: May 12, 2023

(65) Prior Publication Data

US 2024/0233480 A1 Jul. 11, 2024

Related U.S. Application Data

(63) Continuation of application No. 17/336,731, filed on Jun. 2, 2021, now Pat. No. 11,651,649, which is a (Continued)

(51) Int. Cl.
*G07F 17/34* (2006.01)
*G07F 17/32* (2006.01)

(52) U.S. Cl.
CPC ...... *G07F 17/3227* (2013.01); *G07F 17/3211* (2013.01); *G07F 17/3223* (2013.01); *G07F 17/3225* (2013.01); *G07F 17/3286* (2013.01)

(58) Field of Classification Search
CPC ............. G07F 17/3227; G07F 17/3211; G07F 17/3223; G07F 17/3225; G07F 17/3286
See application file for complete search history.

(56) References Cited

U.S. PATENT DOCUMENTS 4,624,463 A 11/1986 Glennon
6,120,376 A 9/2000 Cherry
(Continued)

FOREIGN PATENT DOCUMENTS

GB 120946 A 11/1918
GB 2 229 565 A 9/1990
(Continued)

OTHER PUBLICATIONS

International Search Report and Written Opinion issued in PCT/US2014/025546, dated Sep. 1, 2014, 12 pgs.

*Primary Examiner* — Omkar A Deodhar
*Assistant Examiner* — Shauna-Kay N. Hal
(74) *Attorney, Agent, or Firm* — Woodard Emhardt Henry Reeves & Wagner LLP

(57) ABSTRACT

A system for electronic gaming is described which includes a plurality of individual game stations each of which is constructed and arranged with a user interface. Upstream from each game station is a third party subsystem which includes a corresponding database. This third party subsystem is in data communication with each game station. Also upstream from the plurality of game stations is a gaming server subsystem which includes a database. A central determinate translator system is constructed and arranged in communication either directly or indirectly with each game station and provides a communication link and interface between the gaming server subsystem and each game station.

18 Claims, 13 Drawing Sheets

Related U.S. Application Data continuation of application No. 16/535,540, filed on Aug. 8, 2019, now Pat. No. 11,069,184, which is a continuation of application No. 14/851,365, filed on Sep. 11, 2015, now Pat. No. 10,395,471, which is a continuation of application No. PCT/US2014/025546, filed on Mar. 13, 2014.

(60) Provisional application No. 61/779,015, filed on Mar. 13, 2013.

(56) References Cited

U.S. PATENT DOCUMENTS

| | | | | |
|---|---|---|---|---|
| 6,152,822 | A | 11/2000 | Herbert | |
| 6,309,307 | B1 | 10/2001 | Krause et al. | |
| 6,450,887 | B1 | 9/2002 | Mir et al. | |
| 6,658,396 | B1 | 12/2003 | Tang et al. | |
| 6,733,385 | B1 * | 5/2004 | Enzminger | G07F 17/3227 463/17 |
| 7,291,070 | B2 | 11/2007 | Gatto et al. | |
| 7,793,789 | B2 | 9/2010 | Psaradellis | |
| 7,951,002 | B1 | 5/2011 | Brosnan | |
| 8,277,319 | B2 | 10/2012 | Gong | |
| 8,342,959 | B2 | 1/2013 | Mahaffey et al. | |
| 8,473,242 | B1 | 6/2013 | Hubbard et al. | |
| 2002/0052230 | A1 | 5/2002 | Martinek et al. | |
| 2002/0107072 | A1 | 8/2002 | Giobbi | |
| 2003/0109310 | A1 | 6/2003 | Heaton et al. | |
| 2003/0151554 | A1 | 8/2003 | McCarthy | |
| 2003/0171149 | A1 | 9/2003 | Rothschild | |
| 2005/0059494 | A1 * | 3/2005 | Kammler | G07F 17/3267 463/42 |
| 2005/0113172 | A1 | 5/2005 | Gong | |
| 2005/0239543 | A1 | 10/2005 | Enzminger et al. | |
| 2005/0261058 | A1 | 11/2005 | Nguyen et al. | |
| 2006/0094509 | A1 | 5/2006 | Michaelson et al. | |
| 2006/0154718 | A1 | 7/2006 | Willyard et al. | |
| 2006/0246990 | A1 | 11/2006 | Downes | |
| 2006/0247035 | A1 | 11/2006 | Rowe et al. | |
| 2007/0197281 | A1 | 8/2007 | Stronach | |
| 2007/0256988 | A1 | 11/2007 | Psaradellis | |
| 2007/0290878 | A1 | 12/2007 | Maggio | |
| 2008/0227532 | A1 | 9/2008 | Gelman | |
| 2008/0248846 | A1 | 10/2008 | Stronach | |
| 2009/0298576 | A1 | 12/2009 | Nguyen | |
| 2010/0120538 | A1 | 5/2010 | DeWitt | |
| 2010/0173699 | A1 | 7/2010 | Gagner et al. | |
| 2010/0190553 | A1 | 7/2010 | Buchholz et al. | |
| 2011/0003627 | A1 | 1/2011 | Nicely et al. | |
| 2011/0053672 | A1 | 3/2011 | Gagner et al. | |
| 2011/0093295 | A1 | 4/2011 | Mankad et al. | |
| 2011/0250937 | A1 | 10/2011 | Hubbard et al. | |
| 2013/0072293 | A1 | 3/2013 | Johnson et al. | |
| 2013/0281183 | A1 | 10/2013 | Borissov et al. | |
| 2013/0296047 | A1 * | 11/2013 | Borissov | G07F 17/3225 463/31 |
| 2014/0066188 | A1 | 3/2014 | Brooks et al. | |
| 2014/0066189 | A1 | 3/2014 | Brooks et al. | |
| 2014/0287805 | A1 | 9/2014 | Herbert | |

FOREIGN PATENT DOCUMENTS

| | | |
|---|---|---|
| GB | 212573 | 7/2002 |
| GB | 312340 | 7/2003 |
| GB | 2 398 515 A | 8/2004 |
| WO | WO 2002/049730 A1 | 6/2002 |

* cited by examiner

APPARATUS, SYSTEM AND METHOD FOR ELECTRONIC GAMING

CROSS REFERENCE TO RELATED APPLICATIONS

This application is a continuation of U.S. patent application Ser. No. 17/336,731 filed Jun. 2, 2021, now U.S. Pat. No. 11,651,649, which is a continuation of U.S. patent application Ser. No. 16/535,540 filed Aug. 8, 2019, now U.S. Pat. No. 11,069,184, which is a continuation of U.S. patent application Ser. No. 14/851,365 filed Sep. 11, 2015, now U.S. Pat. No. 10,395,471, which is a continuation of International Application No. PCT/US2014/025546, filed Mar. 13, 2014, which claims the benefit of U.S. Provisional Application No. 61/779,015, filed Mar. 13, 2013, which are incorporated herein by reference.

BACKGROUND

Gaming systems, machines and devices generally are designed to match a selection chosen or created for a player with a system-generated outcome, with payouts to the player occurring when some or all of the elements of a selection match an outcome. Some of the gaming systems, machines and devices which are currently in use for player wagering include electronic games whose outcomes are based on actual past events. One such gaming product known as Historical Racing enables machine- and device-based pari-mutuel wagering with instant payoffs based on the results of actual past events. Device-based wagering would include mobile devices, remote access, online wagering via the Internet and similar technologies.

Most wagering terminals are coupled to a game server. The wagering terminals are multi-function terminals which enable a patron to enter a wager amount and selection(s); choose to watch a video play-back of an earlier event on which the outcome of the wager will be based; and collect for a "winning" wager when his or her selections match one or more of those generated by the event. The game server is a computer system which is configured to manage the entire or at least a majority of the gaming system.

Other electronic gaming systems, machines and devices typically feature the more traditional casino games played on video poker and slot machines, each with a variety of game concepts, graphics and payout scenarios, including but not limited to progressive jackpots. In one prior art example the architecture for the electronic gaming machine includes multiple processors that separate game logic from game presentation. The multi-processor architecture includes a dedicated game logic engine and a dedicated presentation engine. A first processor has the game logic engine and is adapted to handle the input/output (I/O), peripherals, communications, accounting, critical gaming and other game logic, power hit tolerances, protocols to other systems, and other tasks related to operation of the electronic game machine. A second processor is adapted to running a presentation engine. The second processor receives commands from the first processor to present game-oriented outcome and results.

In another prior art example, a gaming device accepts a wager. The wager is logically associated with a first progressive jackpot, the first progressive jackpot associated with a first set of participating gaming devices. The wager is also logically associated with a second progressive jackpot different than the first progressive jackpot, the second progressive jackpot associated with a second set of participating gaming devices, the second set of participating gaming devices comprising more gaming devices than the first set of participating gaming devices.

Also known are arrangements which include computerized management system and methods including accounting, auditing, and correcting systems and processes for use with game and/or gaming devices, systems, and methods. These arrangements enable managers to remotely monitor, control, and modify financial data, reports, and information related to game and/or gaming machines and apparatuses of different classes, for example Class II and Class III gaming machines and table games, and different facilities, such as Class III gaming establishments, bingo establishments, and lottery establishments.

Some of the considerations in the design, utilization and management of gaming machines include the configuration, operation and control of the individual gaming machines (i.e. terminals, cabinets, stations, etc.). Other considerations include the number of players permitted or required within the gaming system, which could mean a single player at a single machine or multiple players at multiple machines. Still further considerations include the manner of inputting game information and data, the manner of determining the wagering/game results and their effect, the interface configurations which might be suitable for incorporating games from various designers or manufacturers, and any machine conversions or changes which might be desired.

Notwithstanding the variety of gaming systems, machines and devices which can be found at casinos, racinos (a term widely used to describe a race track that also houses casino-style gaming) and other approved locations, improvements in terms of game variety and game management are envisioned by the present invention.

SUMMARY

Disclosed as one aspect of the present invention is a central determinate translator system which is part of an electronic gaming system. The concept behind a central determinate translator is to aggregate multiple central determinate markets by defining a universal messaging system (protocol) for delivering centrally determined results to a gaming device. The central determinate markets may include Class II, video lottery, Historical Racing and racing based games as representative examples.

Central determinate markets are gaming markets where the random process that determines the result of the game occurs remotely to where the game itself is played. Traditional bingo is an example of a centrally determined game where a single random process, the drawing of numbered and lettered balls, provides a result to multiple players managing their own bingo cards. In electronic gaming, central determinate typically means an outcome server provides results to many electronic gaming devices. These can be multiplayer games such as bingo and poker or single player games like video lotteries where virtual "scratch-off" tickets are delivered on demand sequentially to electronic gaming machines that reveal the results of the ticket.

One of the objectives of developing a central determinate translator system is to provide a mechanism to allow gaming device manufacturers to create a single product to serve these central determinate markets. The Central Determinate Translator System (CDTS) provides the system infrastructure (hardware and software) and the player interface modifications (also hardware and software) required to drive compatible gaming devices from a central random process. In the case of Historical Racing games, the CDTS generates the game outcomes randomly by selecting from a database of game races, delivering the race data, race simulation data, and race results to the gaming device, displaying relevant race information on the gaming device, and providing the gaming device with a prize value determined by the race result, thus allowing the gaming device to provide an entertaining player experience and result display. In the case of bingo, the CDTS would collect players into bingo games, distribute bingo cards to player terminals, generate and distribute a ball call to each player, display the bingo results on each player terminal, and provide the gaming device with a prize value determined by the bingo game, thus allowing the gaming device to provide an entertaining experience and result display. Once the system is built, relatively inexpensive software changes to the CDTS will facilitate additional central determinate translator solutions.

DESCRIPTION OF THE SELECTED EMBODIMENTS

Figure 1:
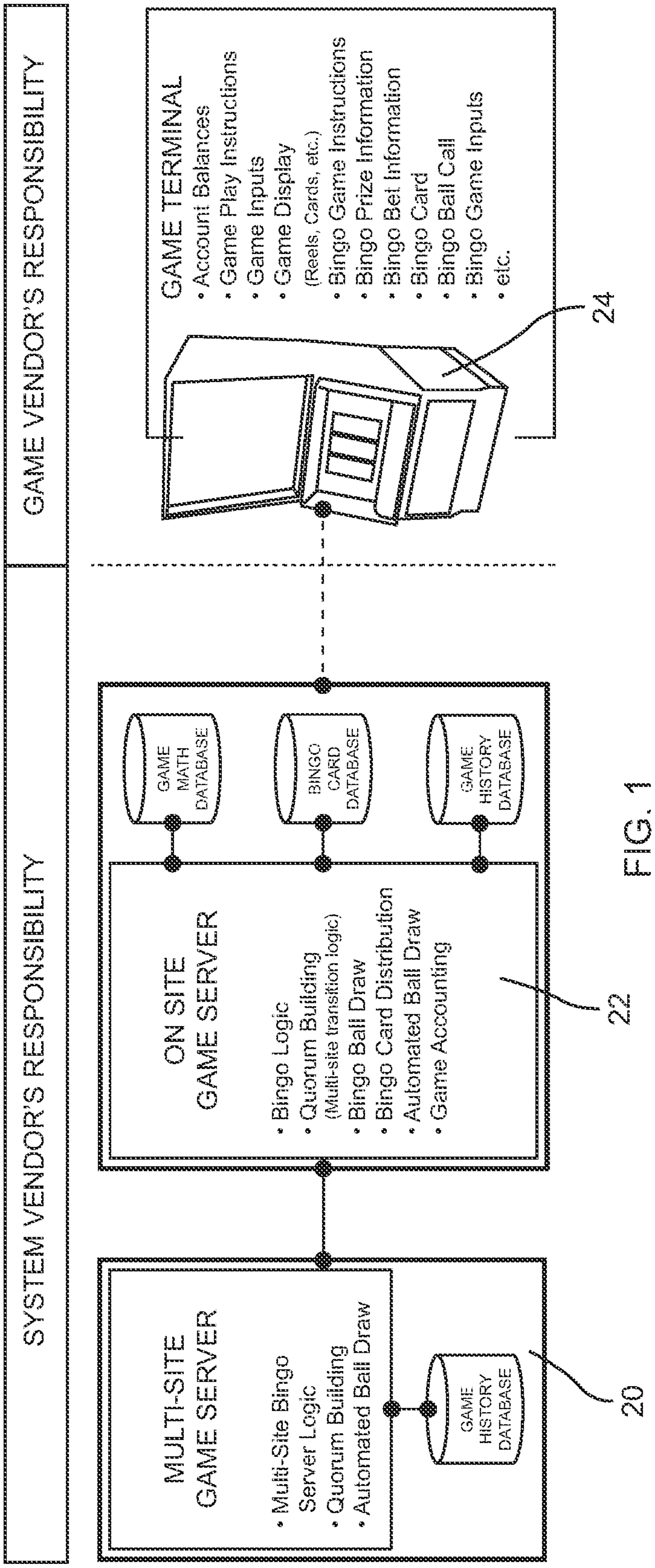
FIG. 1 (PRIOR ART)
FIG. 1 is a schematic layout and flow diagram of an electronic gaming system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

Disclosed herein is a novel and unobvious Central Determinate Translator System which is referred to herein by the acronym, CDTS. This CDTS is constructed and arranged so as to fall within and be covered by the broader title of "Apparatus, System and Method for Electronic Gaming". When the phrase "central determinate" is used in the context of gaming, more specifically electronic gaming, one might logically think of "Class II" gaming, described below, as one example. The Central Determinate Translator portion is referred to by the acronym CDT. Terms such as "station" and "terminal" are used herein to denote the point of play of the particular game. Included within the definitional scope of these terms are conventional casino-like cabinets and terminals as well as mobile devices (smart phones, tablets, iPads® and the like) and play via the Internet on computers and the like.

Figure 2A:
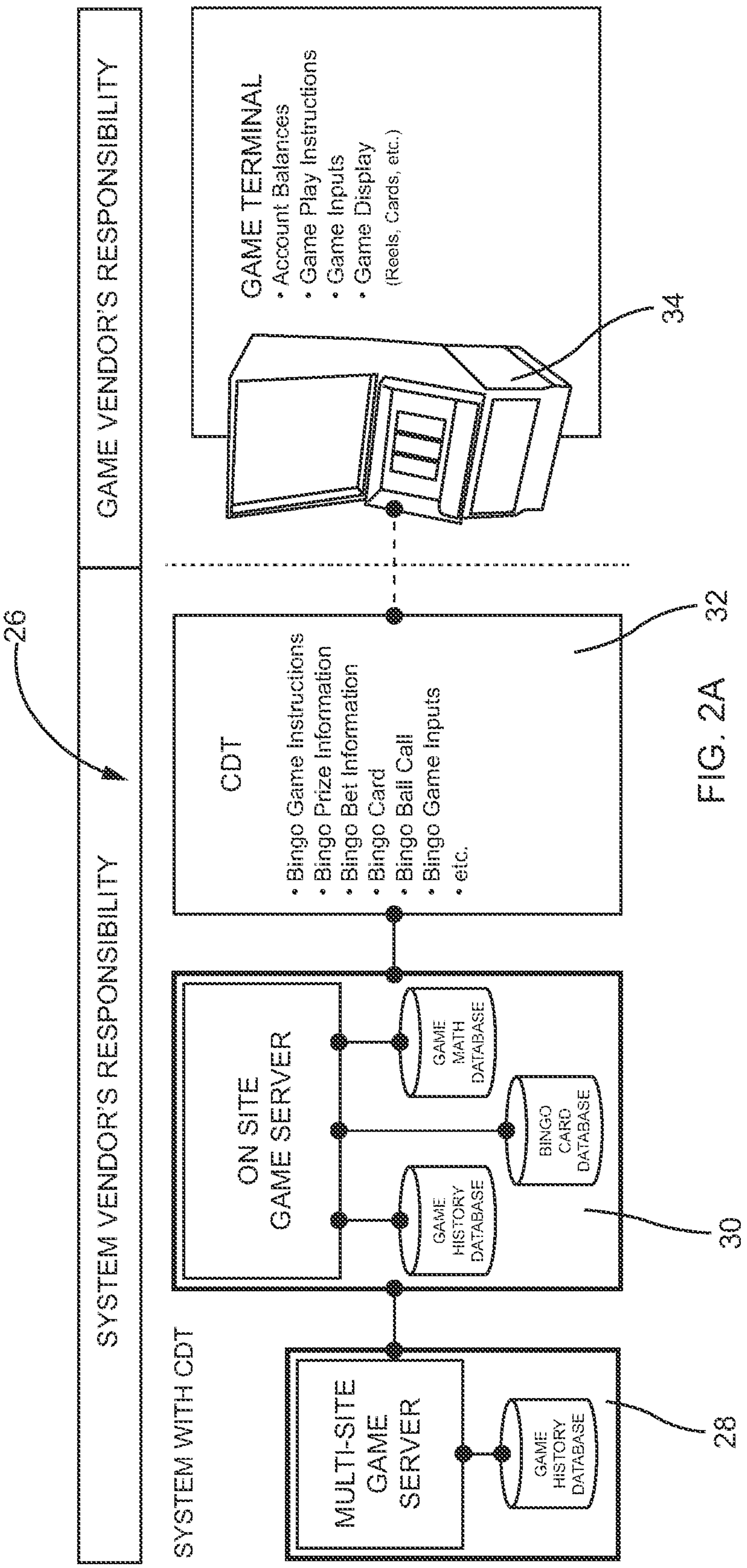
FIG. 2A is a schematic layout and flow diagram of the FIG. 1 electronic gaming system with a central determinate translator incorporated therein.
Figure 2B:
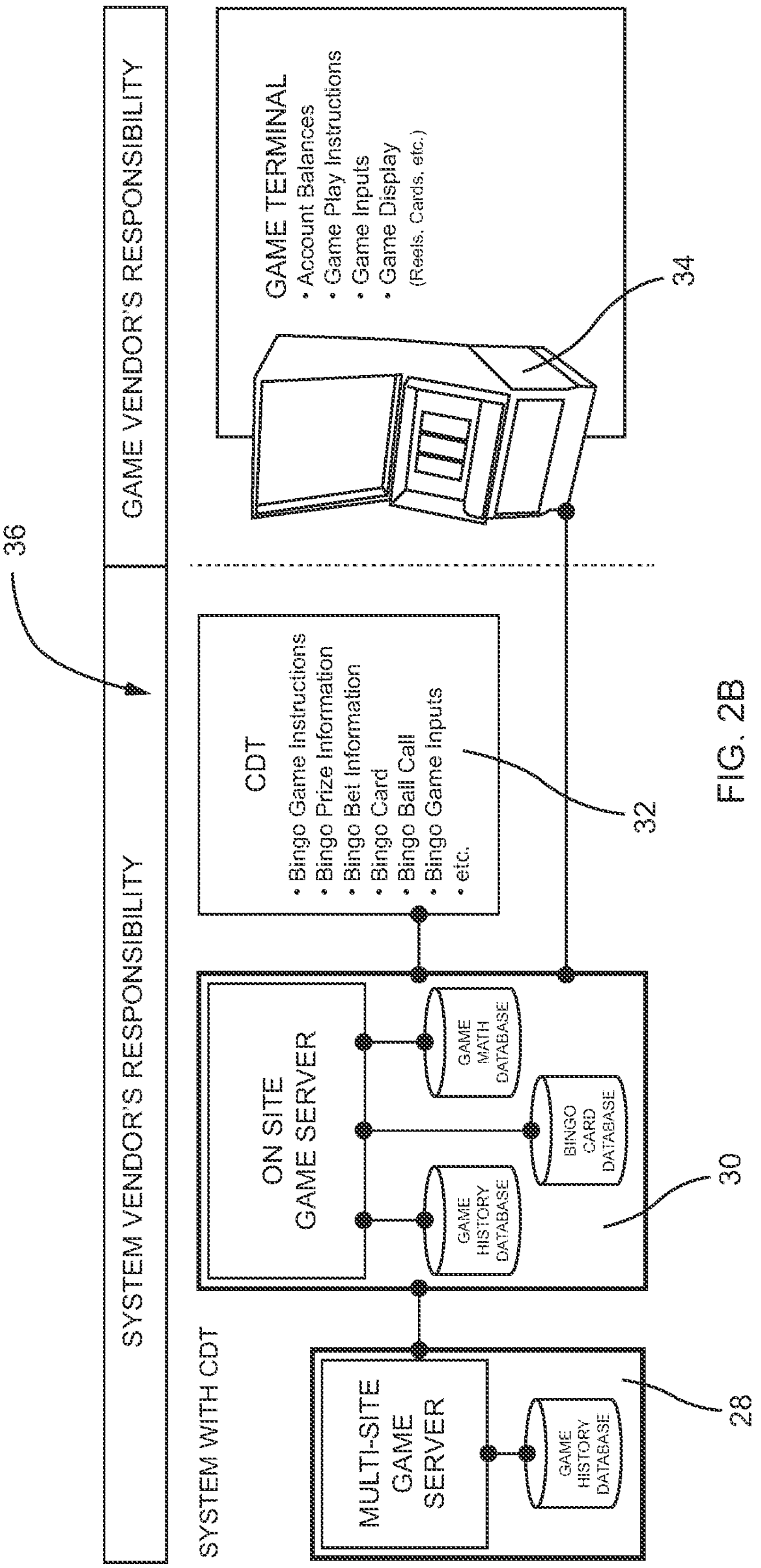
FIG. 2B is a schematic layout and flow diagram of the FIG. 1 electronic gaming system with a central determinate translator incorporated therein with a connection alternative.

Referring first to FIGS. 1, 2A and 2B, the following descriptions and explanations are provided. Class II or Class II. Gaming is a central determinate gaming category defined by the Indian Gaming Regulatory Act (IGRA) that includes bingo and games similar to bingo. Central determinate gaming is any form of gaming where the result of the game is determined remotely to where the player plays the game, making the gaming device simply an interface for entering a game or making a purchase and displaying the result. Whether in the context of Native American gaming or not, the term "Class II" has come to refer to high speed, central determinate bingo games leveraging technological aids to provide non-bingo displays of the bingo result.

A Class II Bingo System must meet the following statutory criteria including:

1) utilizing cards bearing numbers;
2) card holders covering those numbers when objects with matching numbers are drawn; and
3) the game being won by the first person that covers a previously designated pattern.

A Class II Bingo System can be divided into three sections:

1) Gaming Floor Components
2) Back of House Components (on site, but not visible to the player): and
3) Off Site Components (also not visible to the player)

Gaming floor components are typically gaming machines in casino style gaming cabinets, but can be other types of fixed terminals such as kiosks, arcade cabinets, or desktop computers or these can be mobile devices such as smart phones and tablet PCs. These components provide the player interface required to play the game including account management, the wagering interface, information required to play the game, the bingo interface consisting of one or more bingo cards and a ball draw, and an entertaining display for displaying the results. Contemplated by the present invention as a part of all of these options is the use of mobile devices, remote access, and online use via the Internet. Illustrated in FIG. 1 are functional blocks which depict the basic portions of the system, including a game sever 20, on-site game server 22 and a game terminal 24, typically one of a plurality. The generic use of "terminal" includes any type of player interface or station.

The Class II Gaming Problem

Class II gaming markets are relatively small, niche markets compared to traditional casino gaming markets. As a result, these markets rarely attract top tier casino game manufacturers with popular, name brand game content, thus not attracting many of the best products in the industry. As a result, a number of smaller gaming companies with disparate gaming technologies provide equipment to these markets resulting in an inefficient, highly duplicative gaming technology configuration that is difficult for operators to manage. As a practical matter, the inherent cost inefficiency of this process also serves to constrain investment in and production of new games to refresh the marketplace and encourage player participation.

The CDT Solution

The Central Determinate Translator System (CDTS) (see FIGS. 2A and 2B) addresses these problems by providing gaming infrastructure that both simplifies operations for the gaming facility and simplifies development for gaming equipment manufacturers. This is accomplished by moving the line of demarcation between the central determinate system and the gaming machine closer to the machine itself by installing a hardware device in the gaming machine that assumes responsibility for many of the unique central determinate gaming tasks.

As a result of the Central Determinate Translator device:

1) Central determinate gaming floors are unified to a single game server system with multiple game/gaming vendors.
2) All gaming devices can have consistent and familiar user interfaces.
3) Game vendors are no longer required to develop custom software to meet unique jurisdictional requirements. These requirements are handled by the Central Determinate Translator device. This allows game vendors to create a single product capable of being deployed in a variety of central determinate markets.

The FIG. 2A system 26 includes as functional blocks a game server 28, an on site game server 30, a central determinate translator 32, and a game terminal 34, all connected (i.e., in data communication) as illustrated. System 36 of FIG. 2B includes the same components as functional blocks, but with a slightly different connection scheme as is illustrated and described.

What is the CDT System (CDTS)?

The CDTS consists of an arrangement of servers, databases, and a hardware device called the "Central Determinate Translator" and software for each of these devices. In some cases, a software emulator of the CDT hardware may be incorporated as an alternative to the CDT hardware. The CDTS can be deployed in a variety of server and software configurations to meet various jurisdictional requirements, but all configurations include the CDT itself. These configurations can include Class II Bingo, Virtual Scratch Tickets, Historical Racing, Racing Based Gaming and variants that utilize previously run races to generate outcomes, and/or other forms of central determinate gaming.

CDTS for Class II Bingo

FIG. 1 depicts a typical Class II Bingo System. FIGS. 2A and 2B depict a CDT Class II Bingo System to contrast the differences in the two systems. Together these figures illustrate the reduction in the responsibilities of the gaming terminal manufacturer due to moving all of the Class II specific functions off of the gaming terminal CPU onto the CDT CPU.

Class II System without CDT

Class II systems currently in use are produced by a number of manufacturers with slightly different system architectures. Class II systems and gaming terminals typically are provided together as a complete system by each manufacturer. Most of these systems resemble the architecture depicted in FIG. 1 consisting of the following components:

On Site Bingo Game Server

The on-site bingo game server's primary responsibility is to coordinate multiplayer bingo games between gaming terminals. This includes establishing an electronic connection to each player terminal, collecting multiple players into games, assigning and distributing bingo cards to players, distributing bingo balls sequentially to all players in a game, monitoring the cards to determine the bingo winner and consolation (also called bonus or secondary) prize winners, and providing prize results to each player.

The On Site Bingo Game Server connects to multiple databases including a bingo card database (a deck of bingo cards distributed to players), a bingo math database (math specifications for each of the connected games), and a game history database (required for auditing, dispute resolution, and regulatory compliance).

Most Class II bingo systems connect multiple physical, geographically separated bingo facilities to expand participation. In these cases, the on-site bingo server includes logic to determine when and if it is appropriate to join the larger network by connecting to the multi-site bingo server.

Multi-Site Bingo Game Server

The multi-site bingo game server provides the ability to connect bingo players in different physical, geographically separated locations into a single game. Some systems leverage this capability for all games while others leverage the broader network only when necessary. When in use, the multi-site server is responsible for accumulating players into games, distributing the bingo ball call to all players, and determining the winner of the bingo game (the first person to cover a predesigned pattern). Although implementations vary, distribution of bingo cards and determination of consolation prizes typically remain with the on-site bingo server.

The multi-site bingo server may include multiple databases, but will at minimum include a game history database for regulatory compliance, game auditing, and dispute resolution.

Gaming Terminals

Gaming terminals are typically provided by the system vendor and require custom software to be compatible with the vendor's Class II system implementation. These terminals typically consist of a casino style gaming cabinet, computer, display, other peripherals, and game software. The software on these terminals manages account balances, communicates with the gaming system, displays game information, and displays game outcomes received from the system in an entertaining way.

These terminals provide all functionality related to both Class II system and the entertaining game display. This includes:

Account Balance Information
Game Play Instructions
Game Inputs
Entertaining Game Display (reels, cards, etc.)
Bingo Game Instructions Bingo Prizes Information
Bingo Bet Information
Bingo Card Display
Bingo Ball Call Display
Bingo Game Inputs Class II System with CDT As illustrated in FIGS. 2A and 2B, the Central Determinate Translator System (systems 26 and 36, respectively) moves the responsibility for all Class II functions that occur on the gaming terminal 34 to a separate device called the Central Determinate Translator 32. The CDT 32 is a computer installed in or mounted on each third party gaming terminal 34 or a software emulator installed on the third party gaming terminal CPU. The CDT executes software specific to the type of gaming required by the jurisdiction offering the game. The CDT has 3 primary functions:

1) Communicate with the On Site Bingo Gaming Server.
2) Communicate with the Gaming Terminal.
3) Display jurisdiction-specific gaming elements.

In the event that the gaming terminal includes a video display, the CDT can display information on the terminal's own display. If the gaming terminal does not include a video display, the CDT can be equipped with its own dedicated video display.

On Site and Multi-Site Game Servers

The on-site and multi-site game servers perform the same functions discussed in the previous section. In summary, these servers coordinate and account for each player, gaming terminal, bingo card, and prize in each Class II bingo game.

The on-site game server may provide the software interface to gaming terminal providers for receiving outcomes from the class II bingo system.

CDT with Class II Bingo Software

The CDT assumes responsibility for providing and/or displaying to the player all input and outputs required for the Class II bingo games. These functions can be displayed on the main gaming screen or a separate dedicated video screen. For Class II these functions include:

Bingo Game Instructions
Bingo Prizes Information
Bingo Bet Information
Bingo Card Display
Bingo Ball Call Display
Bingo Game Inputs If not provided directly by the gaming server, the CDT provides the software interface to gaming terminal providers for receiving outcomes from the class II bingo system.

Gaming Terminals—Third Party Component

The CDT's software interface enables separating the gaming system vendor and the gaming terminal vendor. By removing all of the bingo specific functions from the gaming terminal to the CDT, the gaming terminal's involvements are reduced to displaying account balance information, game play instructions, game specific inputs, and providing an entertaining game result display.

Broadening or expanding the scope of this disclosure beyond simply Class II gaming, we now look at the "central determinate" concept and related gaming systems. Central determinate markets are gaming markets where the randomized process that determines the result of a wagering style game occurs remotely to where the game itself is played. Traditional bingo is an example of a centrally determined game where a single random process, the drawing of balls, provides a result to multiple players managing their own bingo cards. In electronic gaming, central determinate typically means an outcome server provides results to many electronic gaming devices. These can be multiplayer games such as bingo and poker or single player games like video lotteries where virtual scratch tickets are delivered on demand sequentially to electronic gaming machines that reveal the results of the ticket. Included are various forms of device-based wagering including the use of mobile devices, remote access and online wagering via the Internet.

A central determinate gaming system can be divided into three sections:

1) Gaming Floor Components
2) Back of House Components (on site, but not visible to the player)
3) Off Site Components (also not visible to the player)

Gaming floor components are typically gaming machines in casino style gaming cabinets, but can be other fixed terminals such as kiosks, arcade cabinets, or desktop computers or these can be mobile devices such as smart phones and tablet PCs. These components provide the player interface required to play the game including account management, the wagering interface, information required to play the game, and an entertaining display for displaying the results.

The Central Determinate Problem

Central Determinate Gaming markets are relatively small, niche markets for traditional casino gaming. Due to their relative size and related economics, these markets rarely attract top tier casino game manufacturers with popular, name brand game content. These markets are too small to attract the best providers and products in the industry. As a result a number of smaller gaming companies with disparate gaming technologies provide equipment to these markets resulting in an inefficient, highly duplicative gaming technology configuration that is difficult for operators to manage. As a practical matter, the inherent cost inefficiency of this process also serves to constrain investment in and production of new games to refresh the marketplace and encourage player participation.

The CDT Solution

The Central Determinate Translator System (CDTS) addresses these problems by providing gaming infrastructure that both simplifies operations for the gaming facility and simplifies development for gaming equipment manufacturers.

This is accomplished by moving the line of demarcation between the central determinate system and the gaming machine closer to the machine itself by installing a hardware device in the gaming machine that assumes responsibility for many of the unique central determinate gaming tasks.

As a result of the Central Determinate Translator device:

1) Central determinate gaming floors are unified to a single game server system with multiple gaming vendors.
2) All gaming devices can have consistent and familiar user interfaces.
3) Game vendors are no longer required to develop custom software to meet unique jurisdictional requirements. These requirements are handled by the Central Determinate Translator device. This allows game vendors to create a single product capable of being deployed in a variety of central determinate markets.

What is the CDT System (CDTS)?

The CDTS consists of an arrangement of servers, databases, and a hardware device called the "Central Determinate Translator" and software for each of these devices. In some cases, a software emulator of the CDT hardware may be incorporated as an alternative to the CDT hardware. The CDTS can be deployed in a variety of server and software configurations to meet various jurisdictional requirements, but all configurations include the CDT itself. These configurations can include Class II Bingo, Virtual Scratch Tickets, Historical Racing, Racing Based Gaming and variants that utilize previously run races to generate outcomes, and or other forms of central determinate gaming.

CDTS Components

Gaming Servers

Depending on jurisdictional requirements, gaming servers may be installed on site, off site, or both. These servers execute software specific to the type of gaming required by the jurisdiction offering the game. These servers are responsible for generating game outcomes and communicating these outcomes on demand to the CDTs and to the gaming device. The gaming servers connect to at least one database for game math and additional databases in some game configurations.

Game Database(s)

One or more game databases exist to facilitate central determinate gaming. The Game Database defines which prizes are available for each gaming device connected to the system and the frequencies that those prizes are available. A game math file is loaded into the Game Database for each version of game software executed by the Gaming Terminals (see below). The information in these game math files varies depending on the type of gaming (Bingo, Lottery, Historical Racing, etc.). Based on jurisdictional requirements, additional databases may be utilized. These additional databases may be used for pari-mutuel prize pools, progressive prize pools, bingo card decks, lottery style scratch ticket decks, game history, or other data management functions.

Central Determinate Translator (CDT)

The Central Determinate Translator is a computer installed in or mounted on a third party gaming terminal (see below) or a software emulator installed on the gaming terminal CPU. The CDT executes software specific to the type of gaming required by the jurisdiction offering the game. The CDT has 3 primary functions:

1) Communicate with the Gaming Server.
2) Communicate with the Gaming Terminal (if not provided by gaming server).
3) Display jurisdiction specific gaming elements.

In the event that the gaming terminal includes a video display, the CDT can display information on the terminal's own display. If the gaming terminal does not include a video display, the CDT can be equipped with its own dedicated video display. The existence of a dedicated video display (not illustrated) will be incorporated as part of the CDT when necessary or appropriate in any acceptable manner.

Third Party Components

Gaming Terminals

Gaming Terminals are produced by dozens of manufacturers and typically consist of a casino style gaming cabinet, computer, display, other peripherals, and game software. Unlike traditional casino gaming terminals that include an internal random prize generator, central determinate gaming terminals are programmed to receive prize outcomes from an external device or system. The software on these terminals manages account balances, communicates with the gaming system, displays game information, and displays game outcomes received from the system in an entertaining way.

Third Party Systems

A variety of add on components are available to gaming operators to enhance manageability and guest experience. These include accounting systems and player rewards systems. These systems may connect to gaming terminals directly or through the gaming servers depending on the capabilities of the systems and gaming devices provided by these vendors. These third party components are not part of the CDTS system.

Description of Drawings

Figure 3:
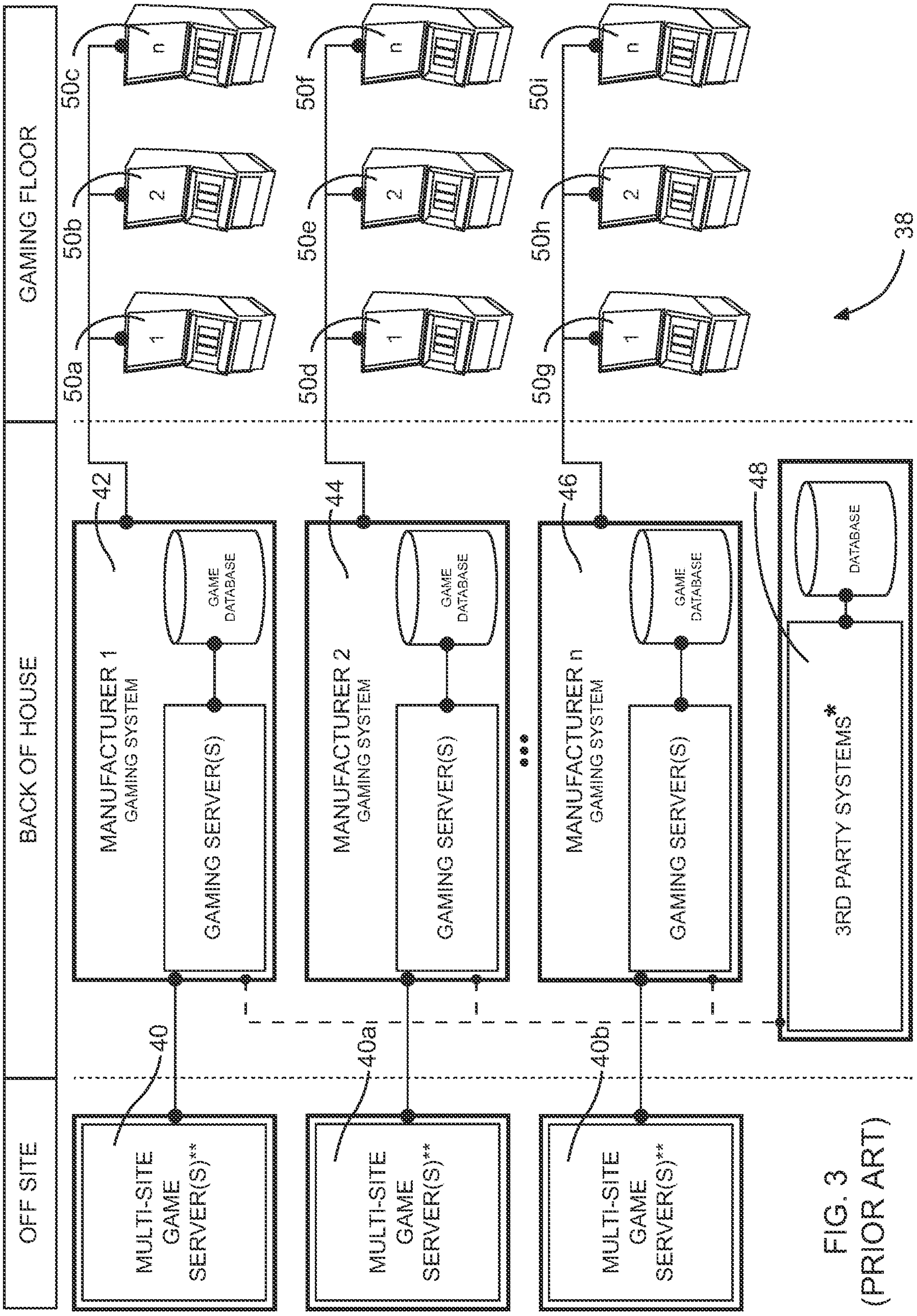
FIG. 3 (PRIOR ART)
FIG. 3 is a schematic layout and flow diagram of a generic central determinate installation which represents the prior art.
Figure 4A:
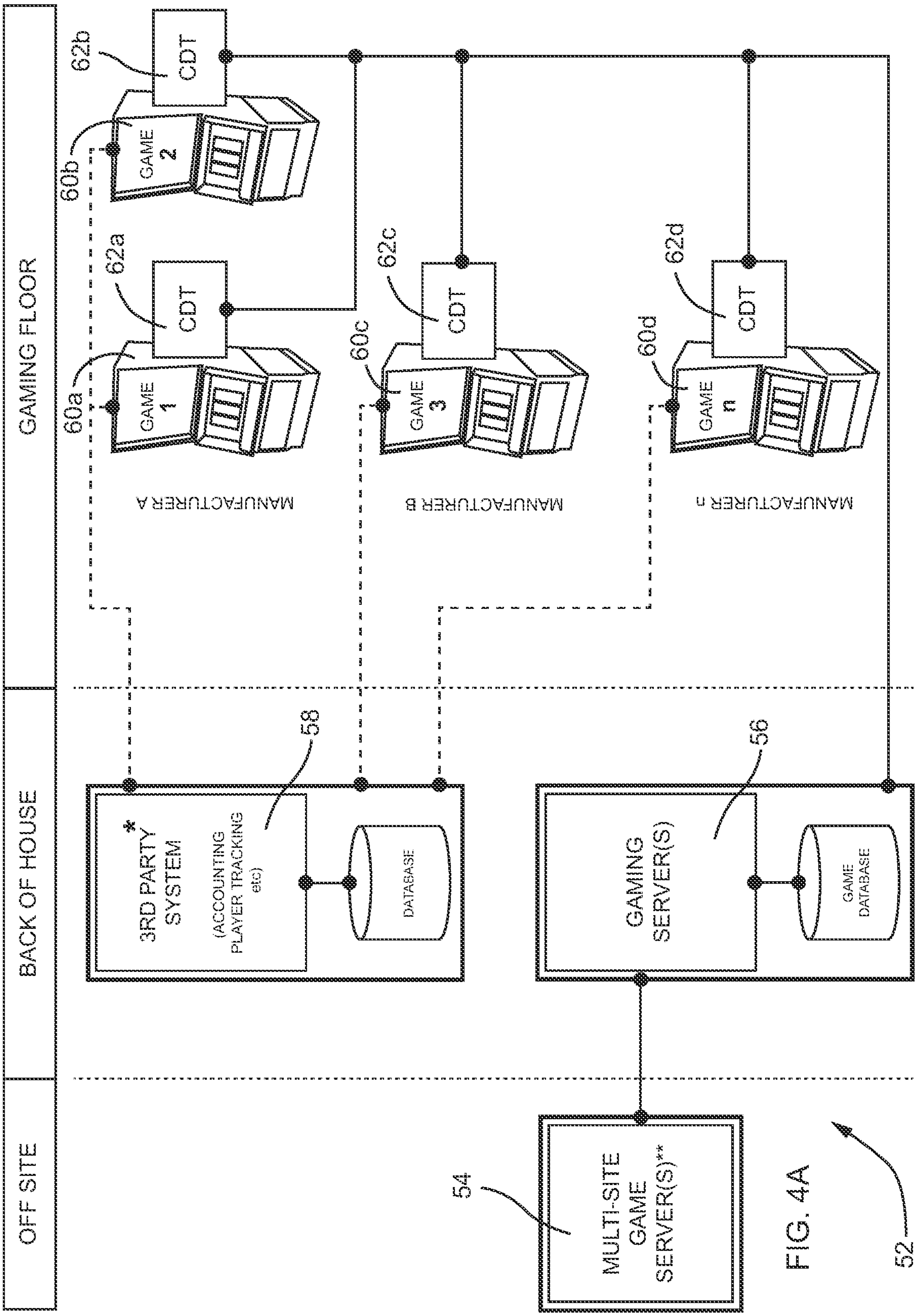
FIG. 4A is a schematic layout and flow diagram of a central determinate installation using a central determinate translator according to the present disclosure.
Figure 4B:
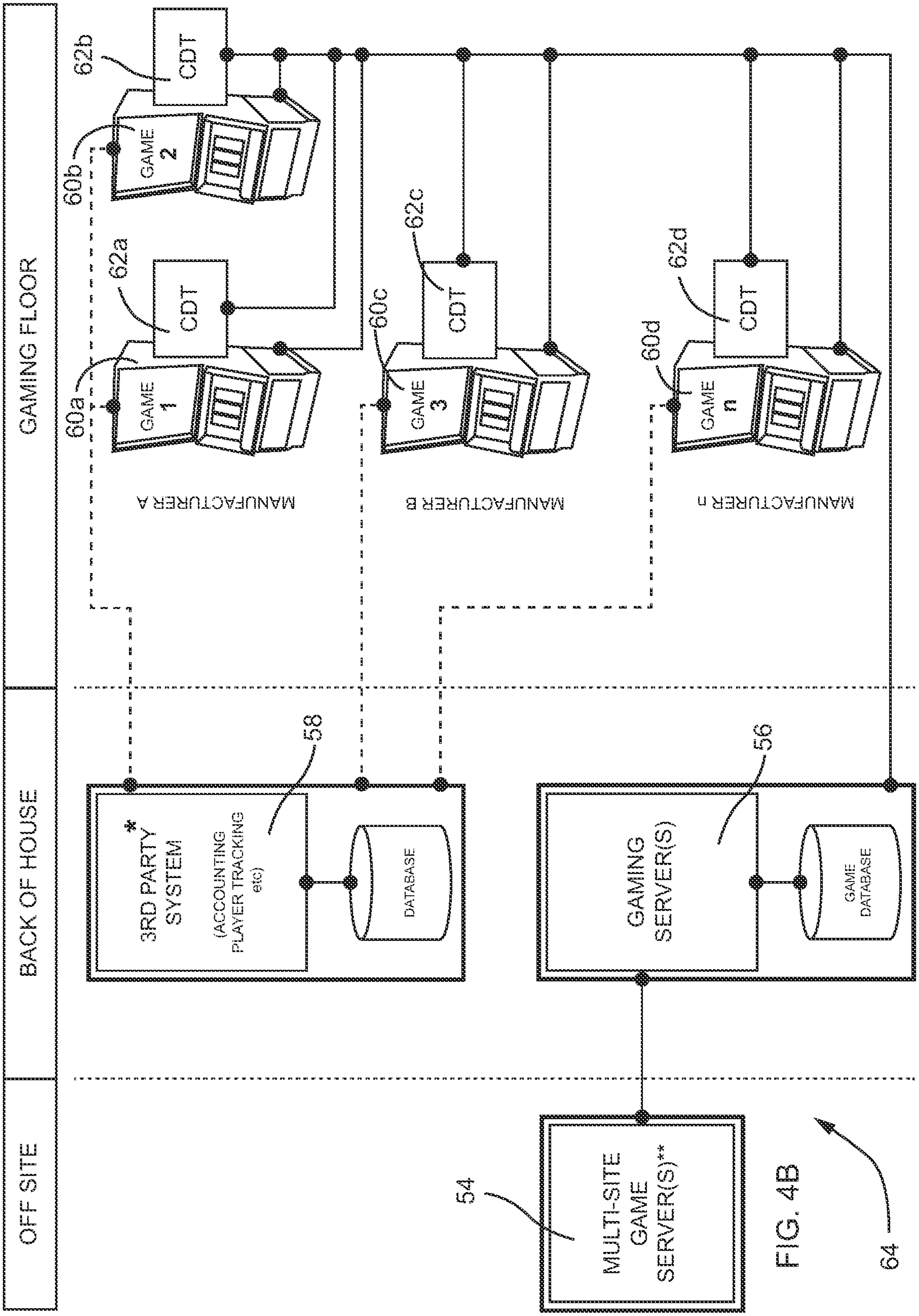
FIG. 4B is a schematic layout and flow diagram of a central determinate installation using a central determinate translator according to the present disclosure with the connection alternative depicted in FIG. 2B.

FIG. 3 depicts a typical generic central determinate installation as it exists today where a single facility operates multiple systems provided by multiple manufacturers in parallel. The FIG. 3 system 38 includes a plurality of off site game servers 40, 40*a*, 40*b*, a plurality of different gaming systems 42, 44, 46 (i.e. coming from different manufacturers), third party systems 48 and a plurality of game terminals 50*a*-50*i* located on the gaming floor. The content and connections are as illustrated and described. FIGS. 4A and 4B depict a generic CDT central determinate installation where a single system provides outcomes to multiple manufacturers' gaming devices through the Central Determinate Translator.

System 52 which is illustrated in FIG. 4A includes an off site game server 54, game servers 56, a third party system 58, a plurality of game terminals 60*a*-60*d* and a plurality of central determinate translators 62A-62*d*, each one assembled to a corresponding game terminal. The content and connections are as illustrated and described. System 64 illustrated in FIG. 4B includes the same group of servers, systems and components as in FIG. 4A, but with a slightly different connection scheme as illustrated and described.

Figure 5A:
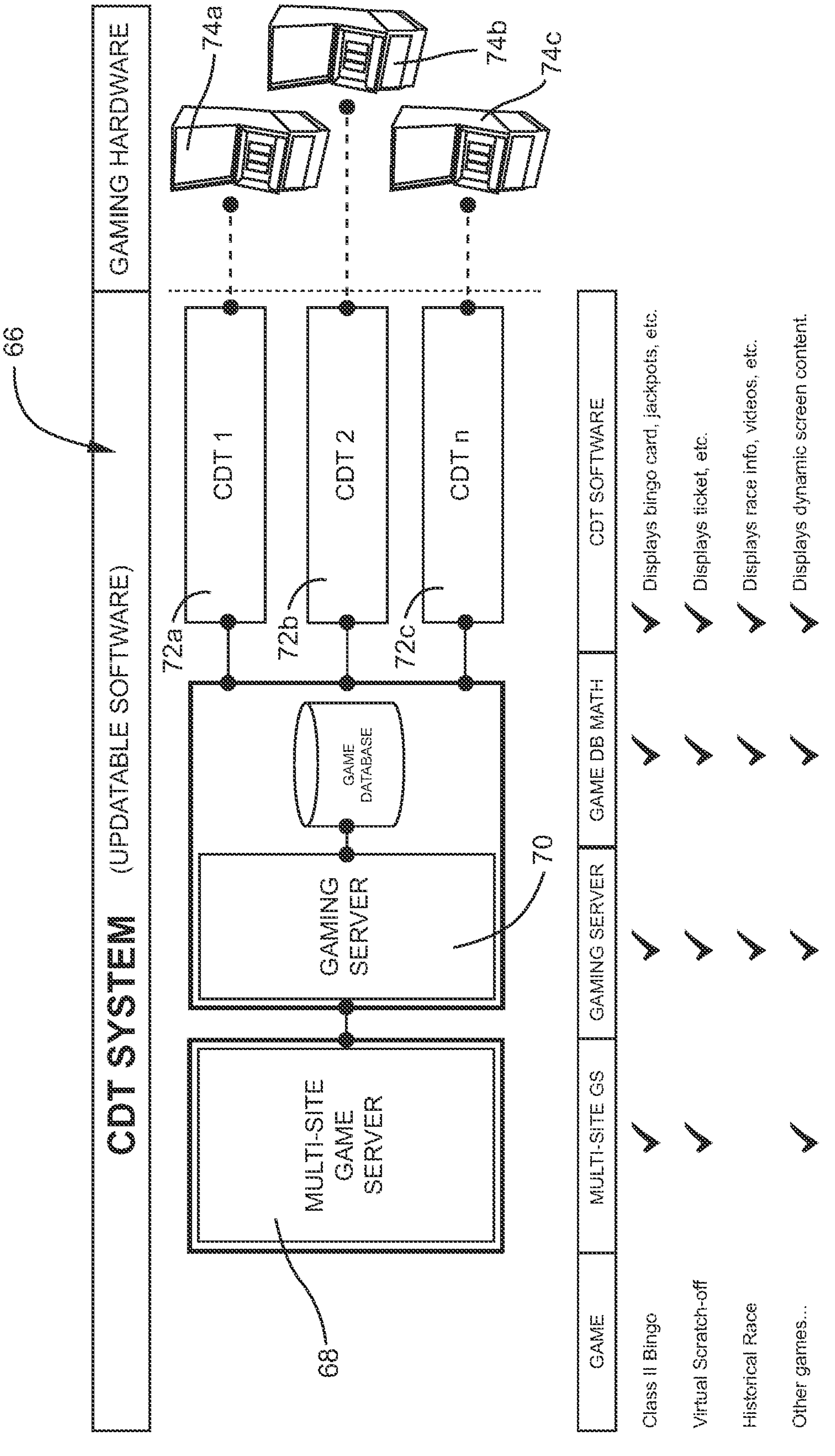
FIG. 5A is a schematic layout and flow diagram of the software changes for converting from one type of central determinate gaming system to another type of central determinate gaming system.
Figure 5B:
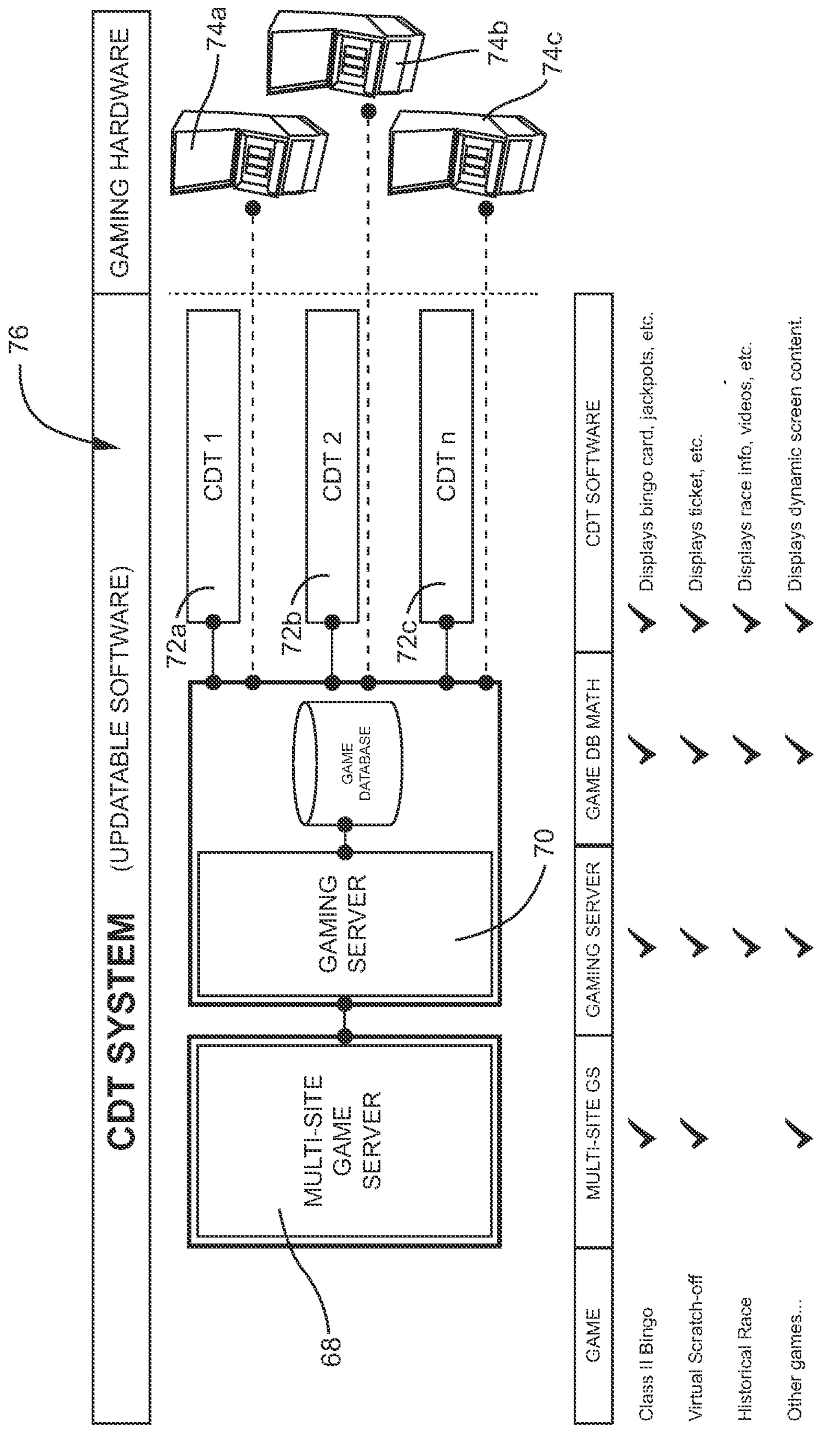
FIG. 5B is a schematic layout and flow diagram of the software changes for converting from one type of central determinate gaming system to another type of central determinate gaming system with the connection alternative depicted in FIG. 2B.

FIGS. 5A and 5B depict the software changes required to convert a CDTS installation from one type of central determinate gaming (for example Class II Bingo) to a different type of central determinate gaming (for example Historical Racing or Racing Based Gaming). Note that the game manufacturer is not affected by the system change. This enables the game manufacturer to deploy the same product into multiple jurisdictions.

System 66 which is illustrated in FIG. 5A includes a multi-site game server 68 connected to a gaming server 70. The gaming server 70 is connected individually to (i.e. in communication with) a plurality of central determinate translators 72A-72*c* which in turn are connected to corresponding game terminals 74A-74*c*. The table which is included as a part of FIG. 5A as shown below the functional blocks outlines the game options and functions of system 66. System 76 illustrated in FIG. 5B includes the same group of servers, central determinate translators and game terminals which are illustrated in FIG. 5A, but with a slightly different connection scheme as illustrated and described.

A more specific example of central determinate gaming is provided by reference to those games which are based, at least in part, on historical pari-mutuel racing or racing based gaming and the results of previously run races.

Historical Racing Overview

Historical Racing (HR) as a subset of racing based gaming is a category of central determinate gaming for wagering on historical races by obscuring some of the details of the actual race to prohibit the player from knowing the outcome in advance. HR may be used for any type or category of competitor. Central determinate gaming is any form of gaming where the result of the game is determined remotely to where the player plays the game, making the gaming device simply an interface for entering a game or making a purchase and displaying the result. HR is implemented through a series of servers and electronic gaming terminals which provide entertaining visual displays to enhance the excitement of the historical race. The result is a gaming terminal used by racing and gaming facilities that is capable of earning at levels similar to other gaming machines while remaining legal in jurisdictions which permit pari-mutuel wagering.

An HR system is based on the following criteria:

1) All betting is pari-mutuel in nature
2) An element of skill is present (players can make informed decisions based on competitor statistics)
3) Games are capable of displaying the outcome of the actual race HR systems can be divided into three sections:

1) Gaming Floor Components
2) Back of House Components (on site, but not visible to the player)
3) Off Site Components (also not visible to the player)

Gaming floor components are typically gaming machines in casino style gaming cabinets, but can be other types of fixed terminals such as kiosks, arcade cabinets, or desktop computers or these can be mobile devices such as smart phones and tablet PCs. These components provide the player interface required to play the game including account management, the wagering interface, information required to play the game, the racing wagering interface consisting of racing stats and betting controls, and an entertaining display for displaying the results.

The Historical Racing Problem

At this time, there are very few HR gaming markets and they are relatively small, niche markets compared to traditional casino gaming markets. Due to their relative size and related economics, these markets rarely attract top tier casino game manufacturers with popular, name brand game content. These markets are too small to attract the best providers and products in the industry. As a result, smaller gaming companies with disparate gaming technologies provide equipment to these markets resulting in a duplicative gaming technology configuration which is difficult for operators to manage and less efficient. As a practical matter, the inherent cost inefficiency of this process also serves to constrain investment in and production of new games to refresh the marketplace and encourage player participation.

The CDT Solution

The Central Determinate Translator System (CDTS) addresses these problems by providing gaming infrastructure that both simplifies operations for the gaming facility and simplifies development for gaming equipment manufacturers. This is accomplished by moving the line of demarcation between the central determinate system and the gaming machine closer to the machine itself by installing a hardware device or software based hardware emulator in the gaming machine that assumes responsibility for many of the unique central determinate gaming tasks. This device is called the Central Determinate Translator (CDT). The CDT is constructed and arranged for performing one or more functions which have been moved from the game station to the CDT.

CDTS for Historical Racing

Figure 6:
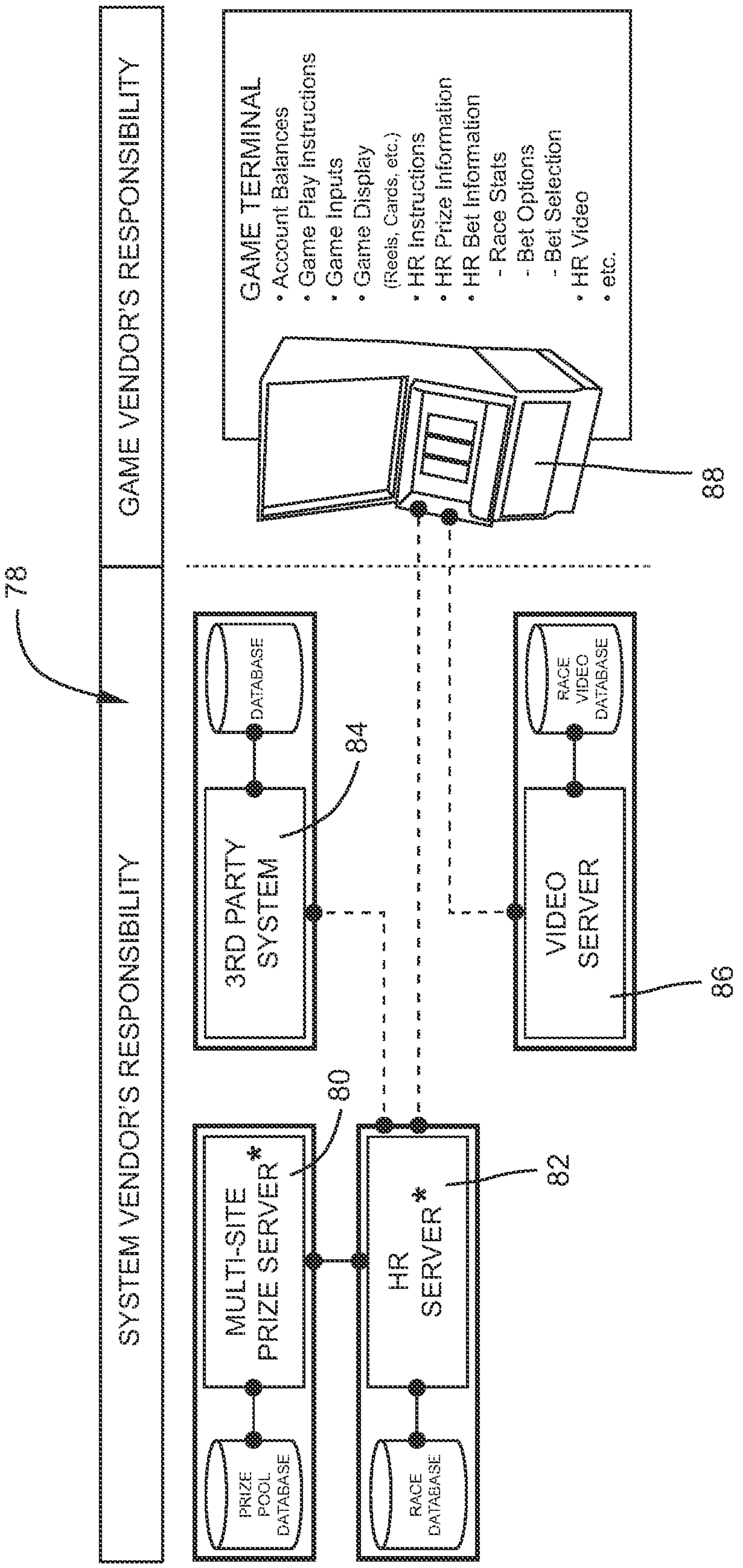
FIG. 6 (PRIOR ART)
FIG. 6 is a schematic layout and flow diagram of an electronic gaming system for historical racing.
Figure 7A:
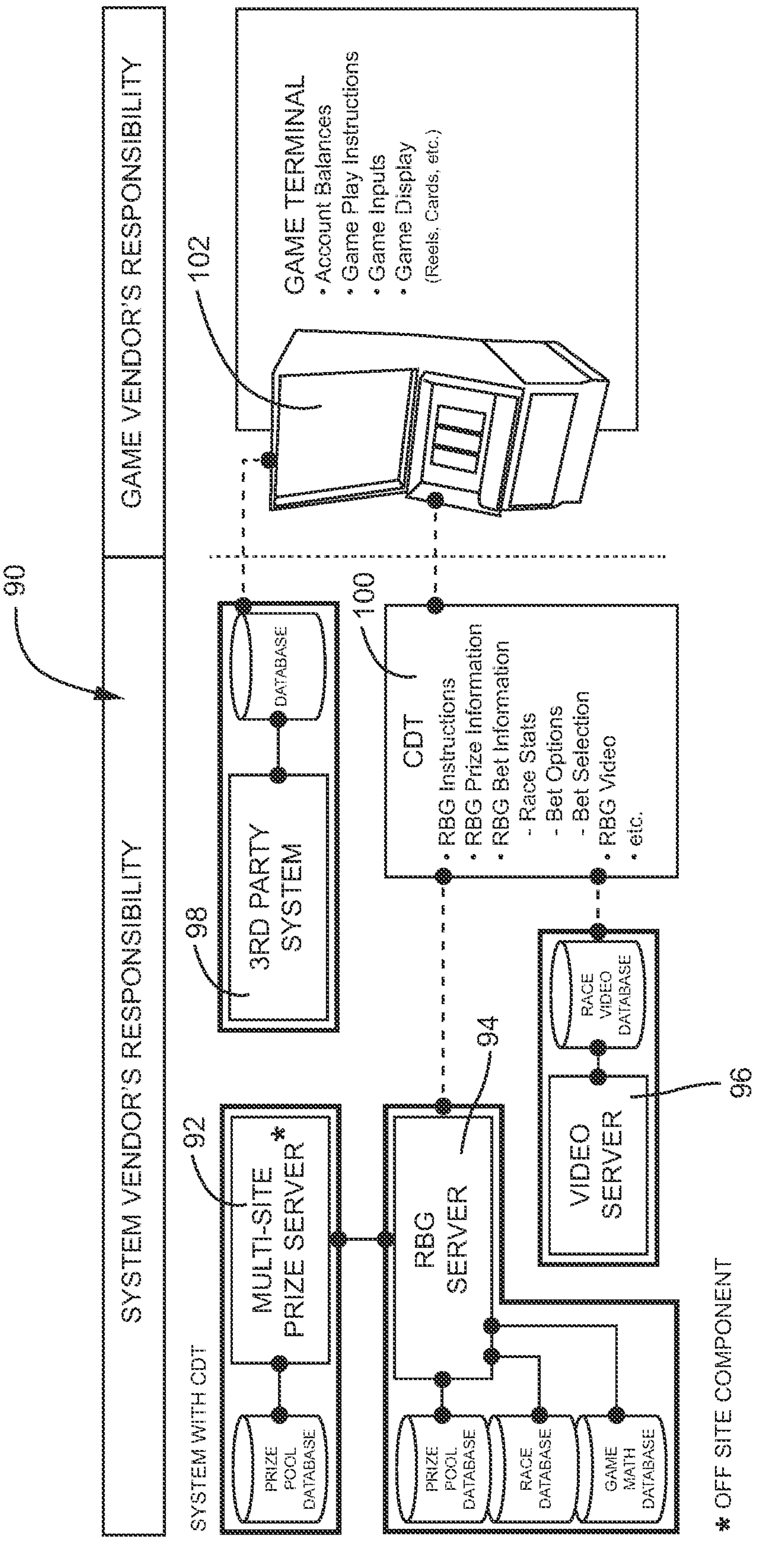
FIG. 7A is a schematic layout and flow diagram of the FIG. 6 electronic gaming system which incorporates a central determinate translator for racing based gaming according to the present disclosure.
Figure 7B:
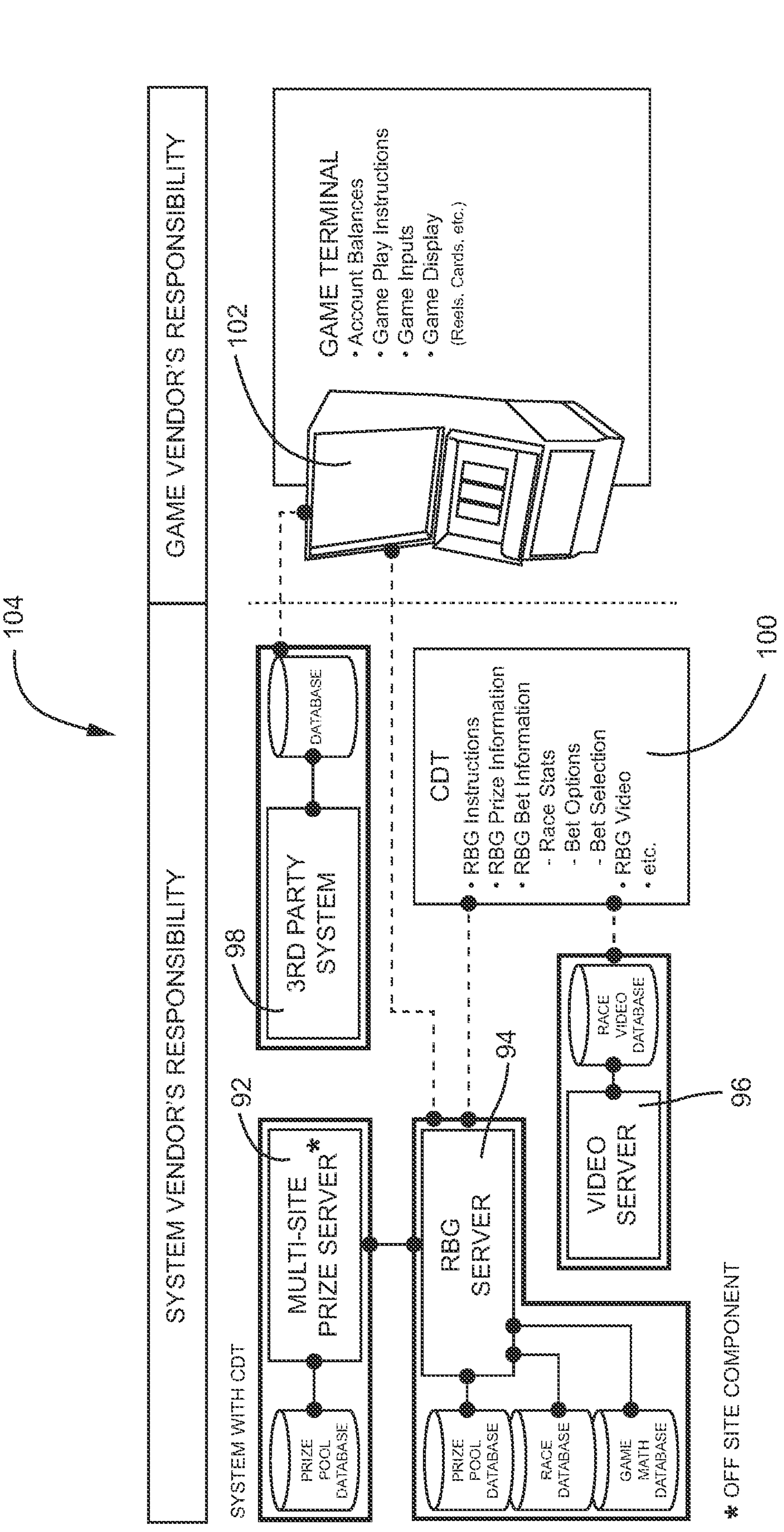
FIG. 7B is a schematic layout and flow diagram of the FIG. 6 electronic gaming system which incorporates a central determinate translator according to the present disclosure with the connection alternative depicted in FIG. 2B.

FIGS. 6, 7A, and 7B provide a comparison of the "before" and "after" of CDT integration. FIG. 6 depicts a typical HR System and FIGS. 7A and 7B depict a CDT Racing Based Gaming (RBG) System as a way to contrast the differences in the two systems. The primary point of FIGS. 6, 7A and 7B is that the responsibility of the gaming terminal's manufacturer is reduced by moving all of the HR-specific functions off of the gaming terminal CPU onto the CDT CPU. Although in FIGS. 7A and 7B only one game terminal is illustrated it is to be understood that the typical gaming system will include a plurality of game terminals.

The FIG. 6 system 78 includes a multi-site prize server 80, a historical racing server 82, a third party system 84, a video server 86 and a game terminal 88. The functional blocks are arranged in communication with each other as illustrated and described.

System 90 which is illustrated in FIG. 7A includes a multi-site prize server 92, a racing based gaming server 94, a third party system 96, a video server 98, a central determinate translator 100 and a game terminal 102. The change from the prior art of FIG. 6 is to add a central determinate translator 100 for each terminal 102 which serves as an interface with the racing based gaming server 94 and with video server 98. The addition of the central determinate translator allows one ore more functions to be moved from the corresponding game terminal for being performed by the central determinate translator.

System 104 which is illustrated in FIG. 7B includes essentially the same group of servers, system, central determinate translator and game terminals as in the FIG. 7A system, but with a slightly different connection scheme as illustrated and described. One subset of racing based gaming is historical racing.

HR System without CDT

The current state of the art for HR systems requires the installation of server components and gaming terminals that are both provided by the same technology vendor. While innovative in their own right, these systems have several deficiencies from a practical perspective. These systems:

1) Have minimal game content variety due to the small size of the market and limited number of vendors.
2) Rely on off-site components for mission critical accounting and game coordination functions. This dependency on off-site servers can result in higher failure rates.
3) Have limited compatibility with third party systems due to the custom system to system interfaces between these systems.
4) Further limit game variety due to antiquated pari-mutuel pool techniques.

The known versions of these systems resemble the architecture depicted in FIG. 6 consisting of the following components:

HR Server 82

The HR Server is located off site at the system provider's facility. This server is connected to a database of historical racing results and has functionality to securely select race results for each Historical Racing Game Terminal (HRGT) on request. The HR Server also interfaces with a second server generically called the Multi-Site Prize Server to maintain pari-mutuel pools for each HRGT. When a player begins a session on an HRGT, the HR Server will randomly select a historical race and communicate statistical information to the terminal for display. Once the player commits to a wager, the HR Server updates the pari-mutuel pools through the Multi-Site Prize Server, compares the player's wager selections with the race outcome, and communicates any winnings information along with race results to the HRGT for display to the player.

HR Multi-Site Prize Server and Prize Database 80

The Multi-Site Prize Server is responsible for managing the pari-mutuel prize pools required for historical wagering. This server separates wagers into appropriate pools to be awarded for placing successful bets. The Multi-Site Prize Server works in conjunction with the Prize Pool Database which maintains real-time pari-mutuel betting information for each HRGT and is managed by the Multi-Site Prize Server. The HR Server communicates wager information to the Multi-Site Server as wagers are processed.

Race Result Database

The Race Result Database resides with the HR Server and contains historical race outcomes and pre-race data for all races that are candidates to be selected.

HR Video Server and Database 86

The Video Database resides on-site at the gaming facility and is managed by its own Video Server. The database stores a video for each historical race contained in the Race Result Database. Each HRGT interfaces with the Video Server to retrieve videos for display to the player once wagers are committed.

Historical Racing Gaming Terminals 88

HRGTs are the player interface for the HR System. Each HRGT is connected through an Ethernet network to the HR Server from which it receives race and prize data. The HRGT provides the following functions:

- Account Management
  - Fund Historical Racing Accounts with a Bill/Ticket Acceptor
  - View Account Balances
  - Cash Out Player Account
- Game Play Instructions
- Game Inputs
- Entertaining Outcome Display (reels, cards, etc.)
- HR Instructions
- HR Prize Information
- HR Bet Information
  - View pre-race odds
  - Bet Options
  - Bet Selection
- HR Video Display Third Party Systems 84

The HR Server interacts with third party systems to improve the manageability of the gaming operation and for enhancing the player experience. These systems can provide cashless accounting services to the gaming system or promotional services to players in the form of player rewards.

The CDT RBG System

The CDT RBG System improves on previous HR systems by physically locating system components closer to the gaming floor and increasing game variety by moving HR-specific functions off of the gaming terminal to the CDT. The system consists of:

RBG Server and Databases

The RBG Server is located at the gaming facility in an appropriate server room near the gaming floor. Moving the RBG Server on site improves network transmission rates and removes failure points throughout the system. This server connects to multiple databases:

1) Prize Pool Database—This database contains the pari-mutuel prize pools associated with each game prize level. Each wager is divided into appropriate prize pools. These pools are awarded in whole or in part based on the outcome of the historical race.
2) Race Database—This database contains race result and pre-race statistical data displayed on the gaming terminal via the CDT. This data is used by the player for informed wagering.
3) Game Math Database—The game math database contains information to map the combination of the race results and the player's selected finishing order to an appropriate prize pool. Each gaming terminal in the facility has a corresponding set of mapping data stored on the server in the Game Math Database.

The RBG Server may provide the software interface to gaming terminal providers for receiving outcomes from the class II bingo system.

Multi-Site Prize Server and Database (Optional)

The CDT RBG System configuration does not require a Multi-Site Prize Server, but one may be used to connect multiple gaming sites for a particular game or to increase the number of wagers available to fund the pari-mutuel prize pools. If a Multi-Site Prize Server is used, it will connect to its own pari-mutuel prize database.

RBG Video Server and Database (Optional)

The video database is an optional component that resides on-site at the gaming facility and is managed by its own Video Server. The database stores a video for each historical race contained in the Race Database. Each RBG Gaming Terminal interfaces with the Video Server to retrieve videos for display to the player once wagers are committed.

CDT with RBG Software

The CDT is a computer mounted in or on each Gaming Terminal or a hardware emulator installed on the gaming terminal CPU that assumes responsibility for providing and/or displaying to the player all input and outputs required for the RBG games. These functions can be displayed on the main gaming screen or a separate dedicated video screen. For RBG these functions include:

- RBG Instructions
- RBG Prize Information
- RBG Bet Information
  - View pre-race odds
  - Bet Options
  - Bet Selection
- RBG Video Display If not provided by the RBG Server, the CDT provides a software interface (protocol) to its associated gaming terminal exchanging outcome and balance information. This information is used by the Gaming Terminal to create entertaining displays of the results generated by the RBG System.

Gaming Terminals-Third Party Component

The CDT's software interface enables separating the gaming system vendor and the gaming terminal vendor. By removing all of the RBG-specific functions from the Gaming Terminal to the CDT, the Gaming Terminal's responsibilities are reduced to displaying account balance information, game play instructions, game specific inputs, and providing an entertaining game result display.

Third Party Systems

The CDT System allows gaming terminals to interact directly with third party systems through industry standard protocols. This allows gaming operators to choose best of breed products rather than be limited to a handful of products that are compatible with the RBG Server as in the non-CDT configuration. These systems improve the manageability of the gaming operation and enhance the player experience. These systems can provide cashless accounting services to the gaming system or promotional services to players in the form of player rewards or other services desired by the facility operator.

Additional details regarding the disclosed apparatus, system and method follow and include additional details regarding some of the specifics and some of the design options.

Figure 8A:
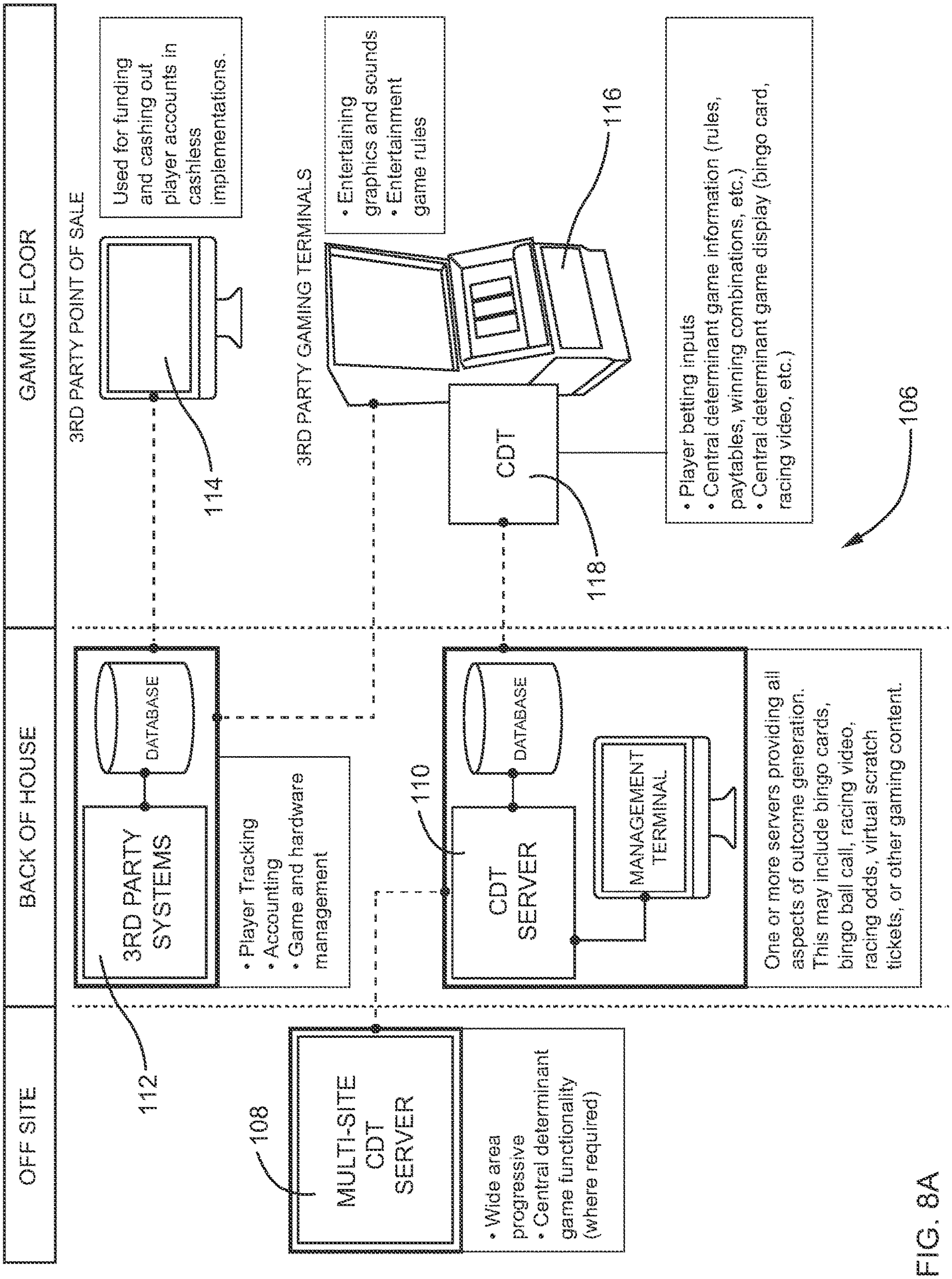
FIG. 8A is another schematic layout and flow diagram of a suitable central determinate translator arrangement and protocol.
Figure 8B:
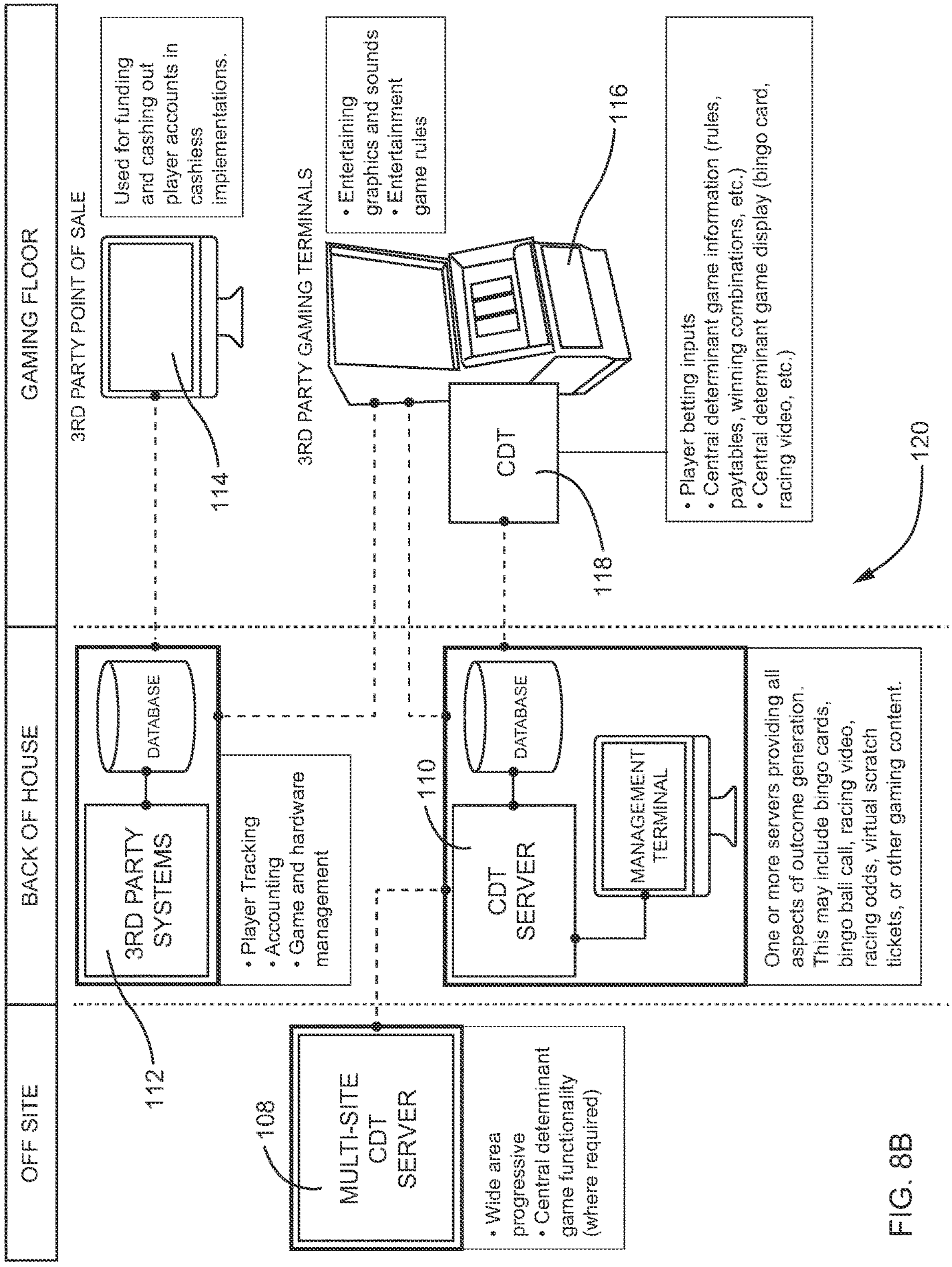
FIG. 8B is another schematic layout and flow diagram of a suitable central determinate translator arrangement and protocol with the connection alternative depicted in FIG. 2B.

With reference to FIG. 8A and FIG. 8B, the Central Determinate Translator invention endeavors to aggregate multiple central determinate markets including Class II, Video Lottery, Racing Based Gaming and Historical Racing by defining a universal messaging system (protocol) for delivering centrally determined results to a gaming device. Central determinate markets are gaming markets where the random process that determines the result of the game occurs remotely to where the game itself is played. Traditional bingo is an example of a centrally determined game where a single random process, the drawing of balls, provides a result to multiple players managing their own bingo cards. In electronic gaming, central determinate typically means an outcome server provides results to many electronic gaming devices. These can be multiplayer games such as bingo and poker or single player games like video lotteries where virtual scratch tickets are delivered on demand sequentially to electronic gaming machines that reveal the results of the ticket.

System 106 which is illustrated in FIG. 8A includes a multi-site central determinate translator server 108 (located off site), a central determinate translator server 110 (located at the back of the facility), a third party system 112, a third party point of sale device 114 and third party gaming terminals 116 each with a central determinate translator 118. These servers, systems, devices, gaming terminals and central determinate translator are arranged and connected in communication with one another as illustrated and described. System 120 which is illustrated in FIG. 8B includes the same group of servers, systems, devices, gaming terminals and central determinate translators as illustrated in the FIG. 8A system but with a slightly different connection scheme as illustrated and described.

The Central Determinate Translator System (CDTS) provides the system infrastructure (hardware and software) and the player interface modifications (also hardware and software) required to drive compatible gaming devices from a central random process. In the case of Racing Based Gaming and Historical Racing, the CDTS will generate the game outcomes randomly by selecting from a database of game races, delivering the race data, and race results to the gaming device, displaying relevant race information on the gaming device, and providing the gaming device with a prize value determined by the race result, thus allowing the gaming device to provide an entertaining result display. In the case of bingo, the CDTS would collect players into bingo games, distribute bingo cards to player terminals, generate and distribute a ball call to each player, display the bingo results on each player terminal, and provide the gaming device with a prize value determined by the bingo game, thus allowing the gaming device to provide an entertaining result display.

This CDTS provides cost savings in two ways:

1. For manufacturers, the CDTS handles all jurisdiction specific central determinate requirements allowing a single gaming device to be deployed in a variety of central determinate markets. Customizations required by gaming machine vendors to enter central determinate markets are minimized by providing a standard game interface allowing access to different types of central determinate markets.
2. For operators, the CDTS eliminates the need for separate gaming systems for each manufacturer thus decreasing operating complexity while maximizing content variety. Furthermore, the CDTS separates outcome determination from other operational functions such as cashless wagering, accounting, and player tracking allowing operators to choose their preferred systems vendors for these functions.

For both operators and equipment manufacturers, the CDTS minimizes the differences between central determinate gaming systems and traditional gaming systems.

CDTS Architecture

The Central Determinate Translator System consists of hardware and software components:

- Central Determinate Translator System (CDTS)
- Central Determinate Translator Server (CDT Server)
- Central Determinate Translator Server Software
- Central Determinate Translator Hardware (CDT)
- Central Determinate Translator System Client Software
- Central Determinate Translator Protocol (CDTP)
- Central Determinate Translator System Simulator (CDTSS)

The CDTP defines communication between the Historical Racing system and a gaming device.

Definitions and Component Descriptions

Central Determinate Translator System (CDTS)

The CDTS refers to the hardware and software components located front of house, back of house, and, in some implementations, off site that make up the complete Central Determinate Translator System.

Central Determinate Translator Server (CDT Server) 110

The CDT server consists of one or more, typically rack mounted, servers located in a secure server room off of the gaming floor. These servers host the CDT Server Software to provide connectivity, outcomes, and jurisdiction specific content to the Central Determinate Translator device. Depending on the installation requirements, the gaming server software may provide outcomes from a variety of central determinate gaming genres including bingo, video lottery, racing based gaming, historical races, or other type of outcome generation mechanism. The CDT server requires a unique math definition file for each game title to provide appropriate outcomes.

The CDT server may provide the CDTP to communicate with third party gaming terminals.

Multi-Site CDT Server 108

Some configurations such as broad participation bingo games may require connectivity between gaming sites. In these cases, an off-site Multi-Site CDT Server is added to the configuration. Note: Many types of central determinate gaming do not require this server.

Central Determinate Translator (CDT) 118

The CDT is a hardware device mounting in or on the gaming machine or can be a software emulator installed directly on the gaming machine CPU. This device provides graphics and data display capabilities as required by the central determinate gaming methodology in use. For video gaming devices, the CDT displays this information on the main video display. For mechanical gaming devices, the CDT includes a secondary display for displaying gaming system specific information. This information may include payables, odds, racing videos, bingo cards, bingo balls, betting buttons, jurisdiction specific information screens, or other types of information. The CDT receives information from the CDT Server and may communicate with the third Party Gaming Terminals via the Central Determinate Translator Protocol over a standard Ethernet connection. The CDT runs the Gaming System Client Software.

Third Party Gaming Terminals 116

Any gaming terminal, regardless of the game type or manufacturer, can connect to the CDT provided that the gaming terminal's software has been modified to receive Central Determinate results via the Central Determinate Translator Protocol and the game specific math conversion has been completed. These terminals will also require appropriate brackets for mounting the CDT hardware.

Third Party Systems/Third Party Point of Sale 114

The CDTS is agnostic to the casino management systems in use by the operator. Third Party Gaming Terminals are expected to communicate directly with the systems using appropriate protocols such as SAS and G2S. These systems may include cashless gaming, accounting, player tracking, or other monitoring and management systems in use by the facility.

Central Determinate Translator Protocol (CDTP)

The CDTP defines all messages, message formats, and expected behaviors, required to connect gaming machines to the CDTS.

Central Determinate Translator System Simulator (CDTSS)

The CDTSS is a development tool provided for gaming terminal manufacturers to test their implementation of the CDTP.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A racing based game system comprising:

a Racing Based Game (RBG) server that is configured to provide racing based game information;

a video server that is configured to provide videos of at least a portion of past racing events;

a Central Determinate Translator (CDT) that is configured to obtain racing based game information from the RBG server and videos from the video server, and to provide dynamic content corresponding to one or more racing based games; and a first game station in communication with and responsive to the CDT, wherein the first game station is configured to obtain from the CDT the dynamic content that is required for playing the one or more racing based games, and wherein the first game station is configured to accept input from a user as specified by game inputs defined by the CDT.

2. The system of claim 1, wherein the RBG server is configured to provide real-time betting information, historical race outcomes, and information for mapping a combination of race results to a prize pool.

3. The system of claim 1, wherein the dynamic content includes the game inputs, the game outputs, game instructions and prize information specific to the one or more games.

4. The system of claim 1, wherein the CDT is integrated into the first game station.

5. The CDT of claim 4, wherein the CDT is implemented in software installed on the first game station and executed by a CPU of the first game station.

6. The system of claim 1, wherein the CDT includes one or more servers that are located remote from the first game station.

7. The system of claim 1, wherein the first game station obtains the dynamic content directly from the CDT and not from the RBG server.

8. The system of claim 1, wherein the CDT defines a universal protocol for delivering the dynamic content to the first game station.

9. The system of claim 1, comprising:

a third party system server separate from the RBG server, the CDT, and the first game station, wherein the third party system is configured to communicate with the first game station, and is configured to perform player tracking and accounting functions.

10. The system of claim 1, wherein the first game station is at a first location, and wherein the RBG server is located at a second location that is remote from the first location.

11. The system of claim 1, wherein the video server is separate from the first game station and is located at a first location with the first game station.

12. The system of claim 1, wherein the first game station is configured to display account balance information, game play instructions, and game results.

13. The system of claim 1, comprising:

a second game station at a second location remote from a first location where the first game station is located, wherein the second game station is configured to allow a user to play the one or more historical racing based games, and wherein the CDT is configured to calculate a first outcome for the one or more historical racing based games using first game instructions and prize information for the first game station, and a second outcome for the game using separate second game instructions and prize information for the second game station; and wherein the first and second game instructions and prize information are defined separately by the CDT and differ according to the first location and the second location.

14. The system of claim 1, wherein the RBG server comprises:

a prize pool database that includes pari-mutuel prize pools associated with the one or more racing based games.

15. The system of claim 1, wherein the RBG server comprises:

a game math database that includes information useful for mapping combinations of race results and selected finishing order input of one or more players to an appropriate prize pool.

16. The system of claim 1, wherein the RBG server comprises:

a race database that includes race results and prerace statistical data about contestants of multiple historical racing events.

17. The system of claim 1, wherein the CDT defines a universal protocol for exchanging outcome and balance information with the first game station.

18. The system of claim 1, wherein all messages, message formats, and expected behaviors, required to connect the first gaming terminal to the RBG server and the CDT is defined by the CDT.

* * * * *